(No Model.)  2 Sheets—Sheet 1.
H. OGBORN.
ROLLER SKATE.
No. 303,450.  Patented Aug. 12, 1884.
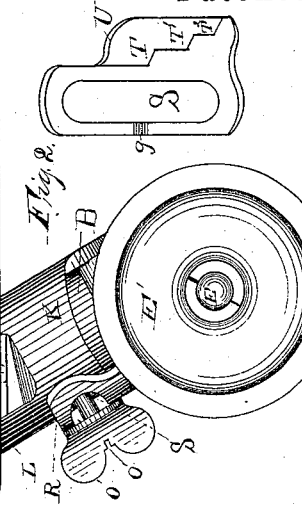
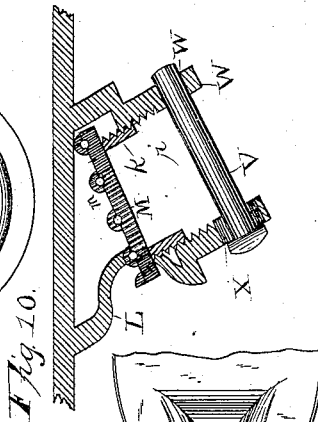
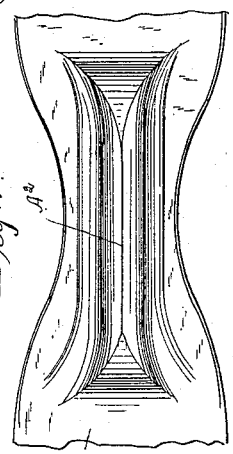
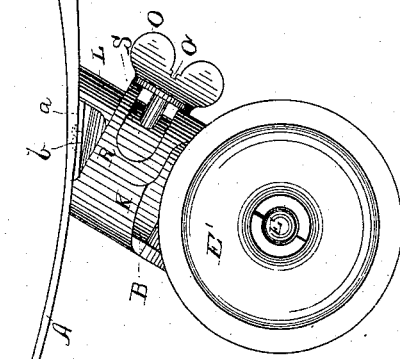
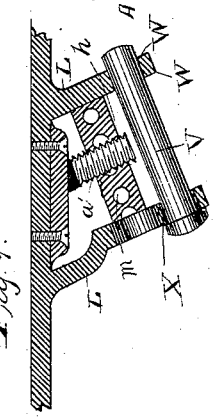
Witnesses:
T. F. Holden
M. F. Halleck
Inventor,
Harrison Ogborn

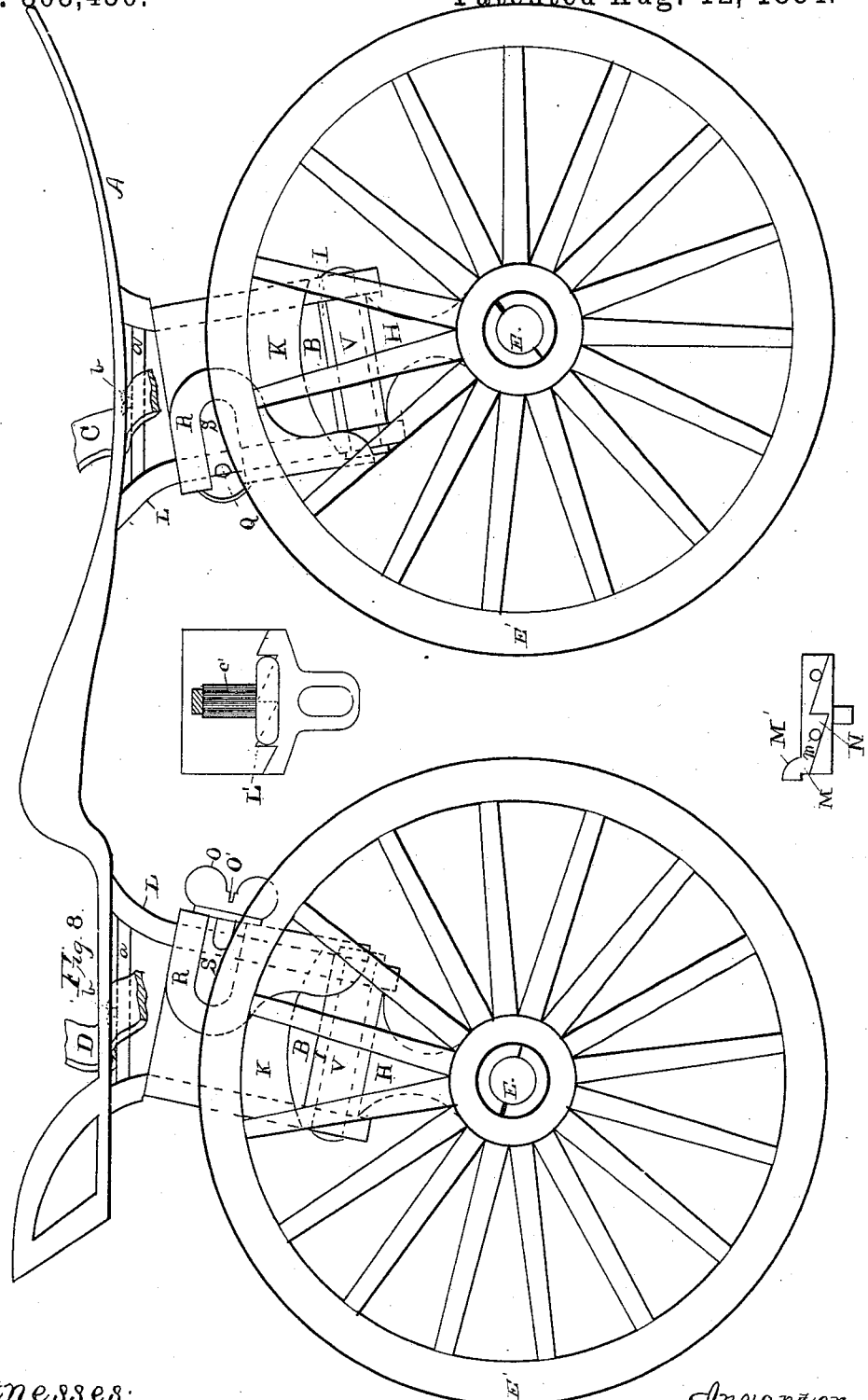

UNITED STATES PATENT OFFICE.

HARRISON OGBORN, OF RICHMOND, INDIANA.

ROLLER-SKATE.

SPECIFICATION forming part of Letters Patent No. 303,450, dated August 12, 1884.

Application filed July 14, 1884. (No model.)

*To all whom it may concern:*

Be it known that I, HARRISON OGBORN, of Richmond, Wayne county, Indiana, have invented certain new and useful Improvements in Roller-Skates, of which the following is a full, clear, and exact description, sufficient to enable others skilled in the art to make and use the same, reference being had to the accompanying drawings, making a part of this specification, in which—

Figure 1 is a side elevation of a skate embodying my invention. Fig. 2 is a side elevation of a detail thereof. Fig. 3 is a vertical longitudinal sectional view of the hanger and details connected therewith. Fig. 4 is a top plan view of part of the skate-plate. Fig. 5 is a cross-sectional view of the shank of the skate-plate. Fig. 6 is a cross-sectional view of the strap-holder and retaining-lug. Fig. 7 is a top view of the anti-friction plate. Fig. 8 is a side elevation of my invention when made for outdoor use. Fig. 10 is a longitudinal sectional view of the working parts of my invention. Fig. 9 is a modification of my invention showing details.

Like letters of reference indicate corresponding parts in the different drawings.

My invention relates especially to that class of skates known as "roller-skates;" and it consists in new and novel devices and in new combinations of the parts, as hereinafter fully set forth, by which means a skate is produced having a great amount of "crimp," and consequent adaptability to make short turns and curves, ease of motion, simplicity of parts, cheapness of construction, and susceptible of a great variety of easy, desirable, independent adjustments, by which a more effective, satisfactory, and durable roller-skate is produced for floors and outdoor use than is now in ordinary use.

The nature and operation of the invention will be readily understood from the following explanation.

In the drawings, A represents the skate-plate, A' the grooves, and A² the brace-ribs thereon.

B is the rubber spring.
C is the ankle-strap.
D is the foot-strap.
E is the wheel-axle.
H is the axle-support.
I is the circular or oval rocker-plate.
K is the rubber-holder—a part of the hanger L.
L' is a series of circular incline planes on the inside of the hanger L.
M is a circular plate against which the side of the rubber spring presses. There is, however, a thin plate of sheet-metal, c, placed between this plate and the rubber, for the purpose of preventing the rubber from sticking fast to the plate M and preventing it being turned to adjust the tension on the spring B.
N is a series of circular incline planes on the outside of plate M, which engage when in use with the circular inclines L'.
O is a thumb set-screw, in which there is a slot, O'; so, if the skate cannot be tightened sufficiently by hand, a screw-driver may be used for the purpose.
P is a screw-hole in plate M, for set-screw O.
Q is a slot in hanger L, in which the smooth part of screw O moves from right to left to regulate the pressure on the spring B.
R is an adjustable stop-plate, having a slot, S, for its adjustment horizontally, so that the steps T T' T² thereon will come in position to stop the vertical movement of the pivot-pin V at any point desired, and thereby permit of any degree of spring desired, or prevent all spring movement, if desired.
U is a projecting flange on the plate R, to hold the pivot-pin V from accidental displacement.
W is a hole in projection W' on hanger L, to retain the upper end of pivot-pin V in place, and should be made flaring inwardly to allow a vertical movement of the other end of the pivot-pin and plate.
X is a vertical slot in projection X', in which the pivot-pin V oscillates vertically when the cushion-spring is in use.
*a a* are strap-holders, over which the straps *n* pass, having on their upper sides forked or flaring pins *b*, which pass upward through the straps *n* and hold them from accidental displacement.

I prefer to cast the body of my skate of malleable iron, brass, gray iron, or other suitable material; but it may be made of wood or struck up from sheet metal, and hangers riveted or otherwise secured thereto, projecting downwardly at the heel and toe. The pivot-pins are respectively inclined to the plane of the skate-plate, as seen in Figs. 1 and 3, which secures the necessary amount of crimp to the wheels to make short curves or turns in skating. The pressure rocking plates are secured in position by pivot-pins V, passing through them, upon which they oscillate, supported at the ends in hole W and slot X, which permits a spring movement of the skate-plate. The rocker-plate rests against the rubber spring in the hanger L, against which it bears and oscillates. Within this hanger there is one or more inclined planes, L'. Held against these planes by the rubber there is a circular plate, M, having corresponding incline planes, N, on its outer edge, but reversed, that slide on the planes L' and adjust the pressure against the spring. The mechanisms in the front and rear parts of the skate are alike, but reversed.
This plate M has a screw-hole, P, in its side for the insertion of the thumb-screw O, and between the hanger and shoulder on the thumb-screw is secured the shouldered plate R, which permits the lower end of the pivot-pin V to move vertically within certain limits, as desired, or entirely prevents its vertical movement, whereby the skate is given a soft cushion or strong cushion movement or no vertical movement at all, as may be desired, by bringing the notched plates in proper position and securing it by the thumb-screw. This plate R is provided with a flange that extends above the head of the pivot-pin and prevents its displacement. To increase the pressure of the spring the thumb-screw is moved to the left in the slot, and to decrease the pressure the thumb-screw is moved to the right. This plate is provided with two holes—one on each side of the screw-hole—to insert a small instrument to act as a lever to assist the screw in making a side movement, if necessary.

I prefer to cast the circular hangers integral with the skate-plate; but they may be cast separately and attached in any convenient manner, which especially adapts it to be neat, cheap, light, and strong. In Fig. 5, the ends of the plate being made thin and cut away where strength is not essential, the under side of the shank is made oval, as shown, and the upper side of the shank with two or more ribs. Between the ribs are one or more grooves, forming an arch on the upper side of the plate, which is light and strong, thus securing simplicity, durability, and freedom from the annoyance of the parts coming apart when in use.

The advantages of placing the ribs or corrugations on the upper side of the plate, instead of the bottom, where they are usually placed, are that when placed at the bottom the pressure of the foot is more likely to crack the ribs, the tendency of the pressure being to bend or break the plate at its longitudinal center. With the ribs placed on the upper side of the plate, they operate as a brace against the pressure of the foot, thus obviating the tendency to crack or break transversely.

In skates provided with pivoted rocker-plates acting upon elastic cushions, much difficulty has been experienced in taking up and compensating for the wear and weakening of the rubber springs, and loss of strength and elasticity by constant use. In my invention these difficulties are overcome by the adjustment of the plate M. On the side of the plate near the screw-hole is placed one or more teeth, d, that engage with notches e on the inside of the hangers, so that when the plate M is adjusted and the screw tightened it is not liable to accidental displacement. This movement of partial rotation of the plate and tooth is made possible by the plate M being enough smaller in diameter than the inside of the hanger to allow the tooth to rotate from one notch to another. The plate R has one or more teeth, g, on its inner lower edge, that engages with a series of notches, f, on the outside of the hanger, as shown, which allows the plate to be set where it is desired to regulate the vertical movement of the pivot-pin, and then securely locked by the set-screw. Another great difficulty to be overcome is the shock and jar to the person, and wear and breakage of the skates in passing over small hard substances or slight inequalites in the floor or ground in the use of rigid skates devoid of elasticity. In some skates this cushion movement is attempted to be provided for, but is not under the control of the skater, because the tightening of the spring to give less oscillation to the skate takes away the cushion movement when it may be wanted most, and the loosening of the spring to give greater oscillation to the foot-plate gives an excessive cushion movement vertically just when it may be desired to give the least; but in my invention the adjustment of the oscillating motion and the vertical spring movement are independent of each other, and an easy or restricted rocking movement of the plate may be had with a stiff or weak spring, and a stiff or weak spring had with either a stiff or weak oscillating movement.

Fig. 8 shows my invention adapted for outdoor use. I construct skates for that purpose as well as for indoor use. The same general principles of construction of my invention that make it useful for one purpose apply with equal force to the other. For outdoor use I use larger wheels, thicker and wider springs, and wider rocker-plates and longer, heavier hangers, as shown in Fig. 8, which are necessary to overcome the jar in passing over rough places. The wheels may be metal or wood, and supplied with flat or rounded tires of metal, rubber, or such other materials as may be necessary to overcome the jar in passing over rough places.

Fig. 10 is a vertical longitudinal section of my invention, showing the manner of raising the plate by a single circular incline plane, on the outside of plate M working in a single circular incline plane on the inside of hanger L. In this case the plate M is raised or lowered by pressure sidewise on the outer flange on plate M, or by inserting levers into holes m and prying it around to raise or lower it and the rubber.

I do not confine myself to any particular form of the hangers, rubber, or plate, as they may be made of other shapes, and the rubber supported and adjusted, as herein shown in the modification of my invention, (see Fig. 9,) which shows a modification of my invention where the plate M is raised and lowered by a screw, i, working in a screw-hole, m, in plate M.

Having described the nature, construction, and operation of my invention, what I claim therein as new and useful, and desire to secure by Letters Patent, is—

1. In a roller-skate, the skate-plate A, having a rounded or oval shank on the lower side, and two or more longitudinal ribs and one or more longitudinal grooves on the upper side, as shown, for the purposes substantially as herein set forth and described.

2. In a roller-skate, the plate A, having a shank rounded or oval in cross-section on the lower side and arched longitudinally, and two or more longitudinal ribs and one or more longitudinal grooves on the upper side, substantially as herein set forth and described.

3. In a roller-skate, the strap-holders a a, and vertical forked or flaring lugs b, in combination with skate-straps C D, constructed substantially as shown and described, and for the purposes set forth.

4. In a roller-skate, the hanger L and circular incline planes L', in combination with circular plate M, and circular incline planes N for regulating the pressure of the springs against the rocking plate, in the manner and for the purposes herein set forth and described.

5. In a roller-skate, the hangers L, circular incline planes L', circular plate M, and circular incline planes N, in combination with screw O for locking and holding the parts in position, in the manner substantially as herein described.

6. In a roller-skate, the hanger L, circular incline planes L', circular plate M, circular incline planes N, and rubber B, in combination with screw O and washer c, constructed and operated for the purposes set forth, and in the manner substantially as herein described.

7. In a roller-skate, the plate m, having shoulders T T' T², flange U, slot S, and tooth g, in combination with hangers L, slot Q, notches e, and screw O, for the purposes and in the manner substantially as herein set forth and described.

8. In a roller-skate, the hanger L and notches e, in combination with the circular plate M, slot Q in hanger, and screw O, substantially as herein set forth and described.

9. In a roller-skate, the plate m, slot S therein, and tooth g thereon, in combination with the hanger L, plate M, tooth m', and notches e on the inside of hanger L, for the purposes and in the manner substantially as herein set forth and described.

10. In a roller-skate, the floor-wheels E', axle E, axle-support H, and rocking plate I, in combination with rubber B, hanger L, notches g in hanger, circular anti-friction plate c, screw O, plate m, having tooth m' thereon, and notches e in hanger, and skate-plate A, constructed substantially as herein set forth and described.

11. In a roller-skate, the floor-wheels E', axle E, support H, rocking plate I, rubber spring B, and anti-friction plate c, in combination with hanger L, screw O, plate m, strap-holder a, vertical forked lug b, and straps C D, constructed substantially as herein set forth, and for the purposes specified.

12. In a roller-skate, the hanger L, plate M, holes m, continuous circular incline plane N, and continuous circular incline plane L', in combination with the rubber B, rocking plate I, pin V, axle E, axle-support H, and floor-wheels E', arranged, constructed, and operated together, for the purposes and in the manner substantially as herein set forth and described.

In testimony whereof I have hereunto set my hand and seal this 30th day of June, 1884.

HARRISON OGBORN.

Witnesses:
M. F. HALLECK,
T. F. HOLDEN.